United States Patent

Hansen

[15] 3,650,678

[45] Mar. 21, 1972

[54] APPARATUS FOR THE STERILIZATION OF A MACHINE

[72] Inventor: Gerhard Hansen, Hofener Strasse 47, D 7013 Oeffingen (Wuertt), Germany

[22] Filed: Dec. 9, 1968

[21] Appl. No.: 782,294

[30] Foreign Application Priority Data

Dec. 20, 1967 Germany ......................P 16 42 069.2

[52] U.S. Cl. ..........................................21/91, 18/5, 53/140, 137/241
[51] Int. Cl. .......................................................A61l 3/00
[58] Field of Search .................21/DIG. 1, 2, DIG. 2, 56, 91, 21/92–94; 53/140; 137/241; 18/5 BF, 5 BH, 5 BZ

[56] References Cited

UNITED STATES PATENTS

| 3,253,882 | 5/1966 | Deackoff | 21/56 X |
| 3,325,860 | 6/1967 | Hansen | 18/5 |
| 3,464,085 | 9/1969 | Burkett et al. | 18/5 |

FOREIGN PATENTS OR APPLICATIONS

| 234,475 | 7/1961 | Australia | 21/2 |
| 487,344 | 10/1952 | Canada | 21/2 |

Primary Examiner—Morris O. Wolk
Assistant Examiner—Joseph T. Zatarga
Attorney—Watson, Cole, Grindle & Watson

[57] ABSTRACT

Apparatus for the sterilization of a machine for the production, filling and closing of containers wherein a source delivering a sterilizing agent is connected to various elements of the machine.

7 Claims, 6 Drawing Figures

Patented March 21, 1972

INVENTOR.
Gerhard Hansen
BY
Watson, Cole, Grindle & Watson
Attys.

APPARATUS FOR THE STERILIZATION OF A MACHINE

The invention concerns an apparatus for the sterilization of a machine for the production, filling and closing of containers consisting of thermoplastic synthetic material, with a dosing device which has valves and a displacement piston limiting a dosing chamber, and with a filling device to which a gas feed pipe is connected. A source delivering a sterilizing medium is connected to the dosing device, whose dosing chamber is made accessible to the sterilizing medium by simultaneous opening of its valves. The sterilizing medium is passed through the filling device via the path which the filler material is to take and is collected at the end thereof and fed away. The sterilizing medium originating from the source is passed through the gas feed pipe and through a bacteriological filter provided therein and, via the path determined for the gas, through the dosing device.

The invention concerns an apparatus for the sterilization of a machine for the production, filling and closing of containers consisting of thermoplastic synthetic material, with a dosing device which has valves and a displacement piston limiting a dosing chamber, and with a filling device to which a gas feed pipe is connected.

It is necessary, for bottling of sterilized filler material, that the pipe runs of the machine, particularly of the dosing device and the filling device are kept free of germs. This is achieved according to the invention in that a source delivering a sterilizing medium to both sides of the displacement piston is connected to the dosing device, whose dosing chamber is made accessible to the sterilizing medium by simultaneous opening of its valves, and in that the sterilizing medium flowing through the dosing device to the filling device is passed therethrough via the path which the filler material is to take, and in that sterilizing medium originating from the source is passed through the gas feed pipe and through a bacteriological filter provided therein and via the path determined for the gas through the dosing device and in that the sterilizing medium passed through the filling device is collected at the end thereof and fed away. In this way it is possible to sterilize, by means of a liquid or gaseous sterilizing medium for example steam, the feed pipes for the filler material and the pipe for the gas, such as air for blowing up the plastic tube into a container and to make the gas itself free of germs.

In a machine, wherein a filling device is arranged separate from an extruder, and through whose head a gas feed pipe, entering into the extruded tube, is passed, a sterilizing medium is passed through the gas piping having a bacteriological filter inserted therein, and subsequently fed away. In this manner sterilization can take place while retaining the volume of the gas, such as air, serving the plastics tube and the run of piping.

Apparatus for carrying out the method according to the invention is characterized in that the feed pipe for the gas has a bacteriological filter, said pipe, before its filter and the dosing device on both sides of its displacement piston being connected to a source of sterilizing medium, the valves of the dosing device being arranged to open simultaneously such that, after flowing through one valve the sterilizing medium flows through the dosing chamber and only thereafter flows through the other valve. With simultaneous opening of the valves, and the dosing chamber interposed therebetween, the sterilizing medium is also passed through the chamber and not past it. The sterile material on flowing through the dosing device will thus not become unsterile. The gas serving to blow up the tube or the container will, during operation be cleaned bacteriologically by the filter, so that the conveying runs of the machine and the interior of the plastics container being produced will be kept free from germs.

In a development of the invention the valves which are pressure and suction valves each have a tube which may be closed off by means of a cam, the connection between the two valves being via the dosing chamber of the dosing device. The tube valves have smooth inner surfaces and are easy to clean. It is also simple to arrange the valves so that the sterilizing medium is bound to flow through the dosing chamber when both valves are open. When using liftable, nonreturn valves as the pressure and suction valves, the danger exists that the sterilizing medium is fed past the dosing chamber without having to flow through it. Multiway cocks require a certain play in the bearings and have hollow places not touched by the sterilizing medium in which bacteria could collect. Even with use of steam as the sterilizing medium, satisfactory sterilization can hardly be obtained since the heat of the steam only works indirectly.

The invention will now be described further, by way of example only, with reference to the accompanying drawings, in which.

Figure 1:
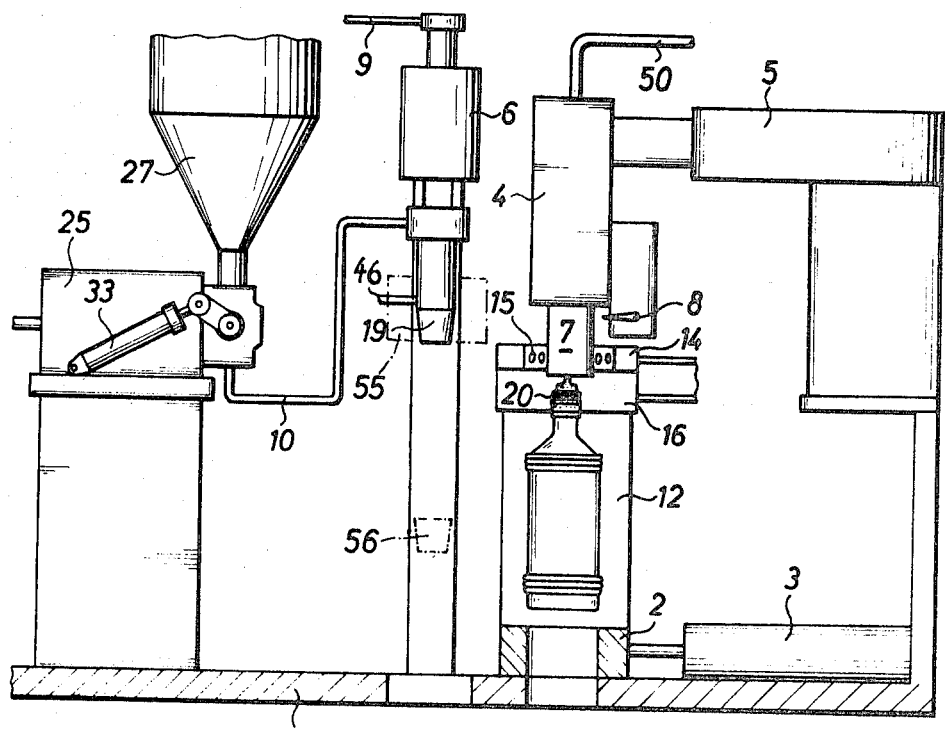
FIG. 1 is a schematic side elevation of a device for the production, filling and closure of plastics containers.
Figure 2:
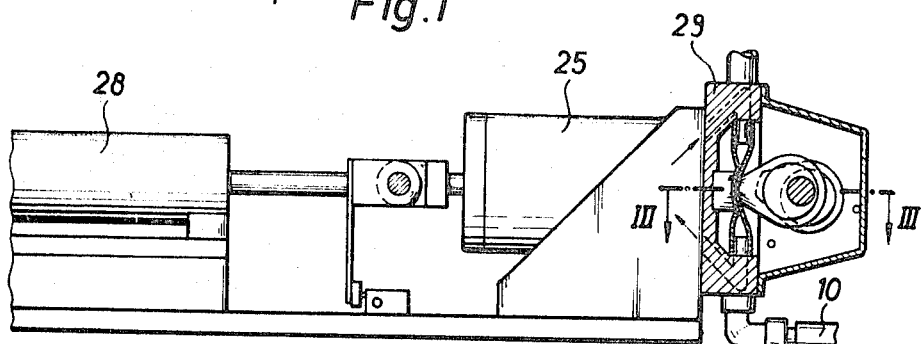
FIG. 2 shows a part of the arrangement of FIG. 1, on an enlarged scale.

A carriage 2 is arranged to be displaced on a table 1, by means of a work cylinder 3 operated hydraulically or pneumatically, from a position below the mouthpiece 4 of an extruding press 5, to a position below a filling device 6 secured on the table 1 and adapted to be raised and lowered. The extruding press 5 serves for the production of a plastics tube 7 made of polyethylene, polyvinyl chloride, or the like and has a knife 8 adjacent the extrusion end of its mouth piece 4 to cut off the plastics tube 7.

A resilient pipe 9 connected to a source of compressed air, a resilient pipe 10 for the feed of filler material, connected to a dosing device 25, and a pipe 46 for evacuating air, are connected to the filling device 6.

The carriage 2 carries two lower mould halves displaceable transversely with respect to the direction of displacement of the piston of the work cylinder 3, of which only one mould half 12 is shown. Each lower mould half carries a vacuum chamber 14 securely connected thereto, which is provided on the side adjacent the tube with suction nozzles 15. An upper mould half 16 for producing the head of the container is displaceable on the lower mould half 12. The upper mould half and the lower mould half are individually displaceable, by means of work cylinders transversely with respect to the plane of the drawing. The lower mould half 12 is provided, on its upper side, and a mandrel of the filling device 6 on its lower slightly conical end, with a heat screening sheath 19. The upper mould half 16 is attached to a source of suction (not shown) in the same way as the chamber 14 and has suction nozzles 20.

Figure 6:
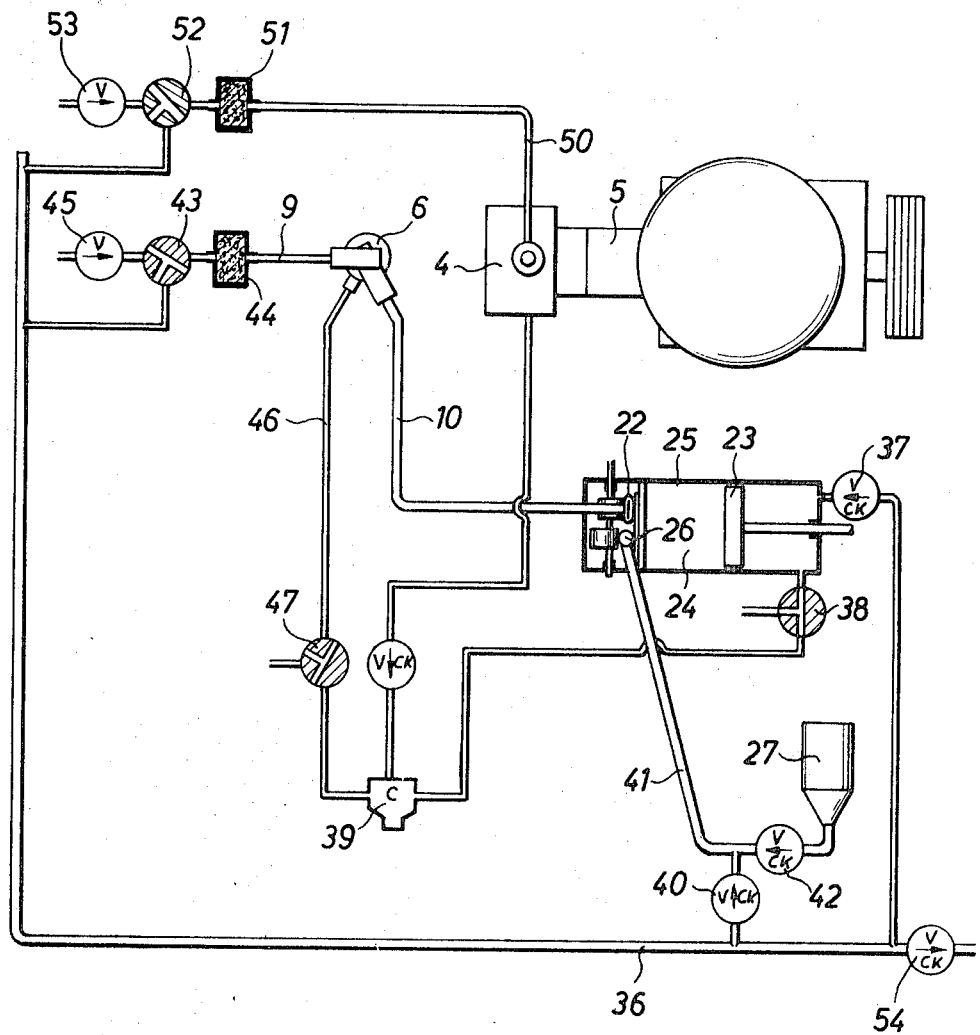
FIG. 6 is a fluid-flow circuit diagram.

The filling pipe 10 is connected via a pressure valve 22 (see FIG. 6) to a dosing chamber 24, limited by a piston 23, in a dosing device 25, the said dosing chamber 24 being connected by a suction valve 26 to a reservoir 27 for the filler material. A chamber 16 limited by the displacement piston 23 remote from the dosing chamber 24 is outwardly closed by means of an end plate resistant to pressure passed through by the piston rod seated therein. The piston 23 may be displaced by means of a work cylinder 28 operated hydraulically or pneumatically and whose stroke may be adjusted.

Figure 5:
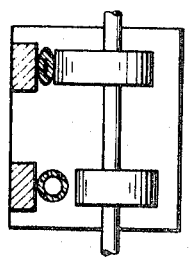
FIGS. 4 and 5 are simplified views corresponding to FIG. 3 but with the parts arranged in different working positions.
Figure 4:
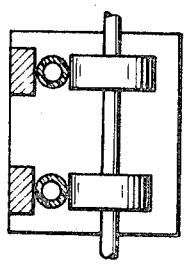
Figure 3:
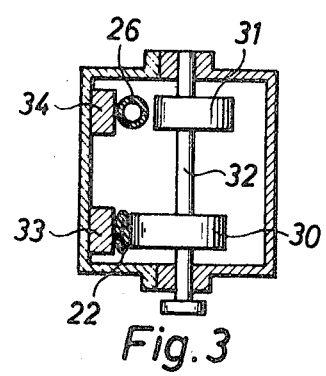
FIG. 3 is a section taken on the line III—III of FIG. 2.

Each valve 22 and 26 is a tire valve and has a tube arranged in a valve casing 29. The two tubes lie parallel to each other. The tube connected at its lower end to the filling pipe 10 is connected at its upper end to the dosing chamber 24 and the tube connected at its upper end to the reservoir 27 is connected at its lower end to the dosing chamber 24. For clamping of the tubes 22 and 26, a cam 30 and 31, associated respectively with the tubes are mounted on a common shaft 32. This shaft can be rotated by means of a work cylinder 33, such that in one position of the shaft, one tube, for example 22, can be compressed by pressing it against a countermember 33 and in the other position the other tube 26 is tightly pressed by the cam against a countermember 34. (FIG. 3 and 5). The two cams 30 and 31, as FIG. 4 shows, can however be adjusted such that the two tubes 22 and 26 allow free passage and are not compressed. The filler material then flows from the reservoir 27 first through the tube 26, then the dosing chamber 24, the tube 22 and the filling pipe 10.

A sterilizing pipe 36 which is attached to a source of sterilizing medium for example a steam generator serves to supply liquid or gaseous sterilizing medium for example pressurized steam at one and a half times atmospheric pressure and 125° C. The pipe 36 is connected via a stop or grate valve 37 to the piston rod side of the dosing chamber 24 which is connected via a three-way valve 38 to a condensate drainer 39 or to the ambient air. The pipe 36 is connected to a pipe 41, lying between the reservoir 27 and the suction valve 26, by means of a stop valve 40, a stop valve 42 serving as a cutoff to the reservoir 27. The pipe 36 may also be connected via a three way valve 43 to the compressed air pipe 9 in which a bacteriological filter 44 is disposed which serves in a purely mechanical manner for the sterilization of compressed air brought over a magnetic valve 45 which valve may be attached via the three-way cock 43 to the compressed air pipe 9. The filling device 6 is adapted to be covered at its lower end by a cup 56 easily placed thereon and removed therefrom which in the placed on position takes over the function of the container being produced by the machine and connects the pipes 9 and 10 by the mouthpiece of the filling device to the air exhaustion pipe 46. A three-way valve 47 is disposed in the pipe 46 which connects the latter either to the ambient air or to a collecting container (not shown), for the filler material taken along with it, or to the condensate drainer 39. The tubes 9 and 10, for feeding in compressed air and filler material, empty on the bottom side of the filling device 6. Tube 46 serves for ventilation of the container to be filled. The bell 56 that can be placed onto the mouth of the filling device and can be removed from it takes over in the put on position the function of a container to be produced by the machine and it connects the tubes 9 and 10 guided through the filling device by the mouthpiece of the filling device with the ventilation tube 46. With the aid of the three-way valve 47, the tube 46 can be connected with the surrounding air or with a collecting vessel or the diverter 39 for the condensate.

A pipe 50 is passed through the extruder head and the mouthpiece 4, which is adapted to be connected via a three-way valve 52 and a magnetic valve 53 to a source of compressed air (not shown). This provides the piece of tube 7 with compressed air which prevents the latter from closing up on cutting off of a piece of tube by the knife 8. A bacteriological filter 51 corresponding to the filter 44 is provided in the pipe 50. The pipe 50 can also be connected to the pipe 36 by means of the three-way valve 52. The pipe 50 can be connected for easy release, at the mouthpiece, to a pipe leading to the condensate drainer 39 which can be closed off by a valve when removed from the extruder. The filling device is surrounded by a box 55, shown in chain dotted lines in the vicinity of its mouthpiece having the heat screening cover 19, and whose bottom end lies at the height of the upper side of the chamber 14 and is attached to a source of sterile gas, more particularly air, ethylene-oxide or the like heated up to 300° C. and fed via a filter, and prevents unsterile air flowing to the mouthpiece. During operation of the device, the chamber 55 serves to keep the mouth of the filling device free of germs. For this purpose sterile gas under a slight excess pressure is introduced into the chamber, so that the mouth as long as it does not submerge into the section of the hose for the production of the container is surrounded by sterile gas. The sterile state of the mouth achieved prior to the operation will be maintained as a result thereof and this even during the operation. Thereby reinfection of the mouthpiece, sterilized before operation, is prevented during operation, such that it is constantly in a stream of sterile, slightly overpressurized, gas which flows slowly past it. A type of gas-douche may also be used for the same purpose. It is also possible to surround the head of the extruding press with a box for the feed of sterile gas.

The machine is sterilized during heating up. For this purpose, steam at 125° C. and one and a half times atmospheric pressure is circulated through the pipe 36 provided with a cutoff valve 54. The steam flows via the valve 40, the pipe 41, the open valve 26 (FIG. 4), the dosing chamber 24 and the pressure valve 22 and then arrives via the pipe 10 at the filling device 6, and flows therethrough over the path travelled by the filler material. As explained above, bell 56 is placed on the mouth of the filling device for the purpose of sterilizing the machine, and it acts in relation to the connection of tubes 9, 10 and 46 like a container that is to be blown up or inflated by the filling device. The steam then passes via the cap 56 releasably connected to the filling device and the pipe 46 into the condensate drainer 39.

At the same time the pipe 9 is connected by the three-way valve 43 to the pipe 36, from whence the steam flows via the filter 44, the pipe 9 and via the compressed air pipe to the filling device and finally flows via the cap just attached and the pipe 46 into the condensate drainer 39. At the same time steam flows via the valve 37 to the side of the piston 23 remote from the dosing chamber 24 and passes by the three-way valve 38, suitably adjusted, likewise into the condensate drainer 39. The steam flows in the compressed air tube 9 and filling tube 10 right through the filling device up to its mouth, which is surrounded by the bell 56 in such a way that a connection to the ventilation tube 46 exists. The steam, therefore, is fed to the mouth in two ways and is removed in one way by the inside chamber of bell 56.

The pipe 50 circulating the compressed air for the plastic tube, via the magnetic valve 53 is connected via the three-way valve 52 to the steam pipe 36, through which steam flows, via the filter 51 and the pipe 50, to the mouthpiece 4 of the extruder and into the condensate drainer 39.

For operation of the machine, the cutoff valve 40 is closed, the pipes 9 and 50, are separated from the pipe 36 by means of the three-way valves 43 and 52 and the cap 56 is removed from the dosing device as well as a corresponding extension from the mouthpiece 4, after the valve to the drainer 39 has been closed. The cutoff valve 42 is opened and connection with the ambient air established via the three-way valve 38. During operation saturated steam is passed around at slightly over atmospheric pressure so that the dosing device is protected from this side against entry of bacteria, and sterile filler material is delivered from the sterile reservoir 27. The said material is drawn through the suction valve 26, the pressure valve 22 being closed, into the dosing chamber 24 and with the pressure valve 22 opened and the suction valve 26 closed is forced into the filling device 6. The air fed in via the filters 44 and 51 is in each case sterile. The mouthpiece of the filling device, during operation, at least in its position of rest lies in a stream of sterile gas and on dipping into the hot tube filled with sterile air is surrounded by this so that unsterile air cannot come into contact with the mouthpiece. Consequently the machine is sterilized in the stationary state as the plastics tube is sterile in any case.

If the machine for the production, filling and closing of a container made of thermoplastic material is to be put in operation after the sterilization, then the above-mentioned measures must be carried out. In order that the device retain its sterile state even during the operation, the connection to the source of steam will be kept open by the valve 37. For filling up, sterile filling material is used. The compressed air needed for inflating the container is sterilized in the bacteriological filter 44 and air fed to the extruder or to the extrusion press is sterilized in filter 51. The mouthpiece of the filling device lies, at least in the lifted position, in the area of box 55 and thus in a current of sterile gas.

During operation the plastics tube 7 is constantly pressed out of the extruding press. As soon as the piece 7 of tube has reached a sufficient length, the halves of the lower mould 12 move together and receive the piece of tube between them. The top of the piece of tube is held by the vacuum in the vacuum chamber 14 after it has been cut by the knife 8 from the piece of tube located at the mouthpiece 4.

The mould 12 then travels to a position below the filling device 6 which lowers itself onto the lower mould halves 12, the mandrel dips into the tube and, with interposition of the tube, rests on the lower mould halves 12. Compressed air is blown in through the pipe 9 which presses the tube of plastics against the wall of the mould. The filler material is then introduced in the container by means of the dosing device 25 via the filling pipe 10 which forces the compressed air out. After the filling of the container the filling device 6 is raised and the mould halves 16 close to form the head of the container the piece of tube being applied to the upper mould halves 16 by means of a suction device. On switching off the source of vacuum the mould halves open and the filled container falls out downwardly. The mould then travels back to a position below the mouthpiece 4 of the extruding press 5 to receive a new piece of plastics tube.

For a more detailed description of the operation reference may be had to U.S. Pat. No. 3,325,860.

During operation a slight pressure is maintained in the pipe 50 which prevents the walls of the plastics tube coming together when cut. Before the cutting off takes place, the tube is closed at its lower end by the lower mould halves 12. In the hot plastic, plastic hose extruded from the extruder, a slight excess pressure must be maintained, so that the walls of the hose will not stick together and weld together. The excess pressure must be maintained sufficiently so that, upon cutting off a piece of hose from the extruded hose, the walls do not fit against one another and weld together.

With a mandrel adapted to be raised and lowered and which is passed through mouthpiece 4 of the extruding press 5 it may prove necessary to inflate slightly the piece of tube pressed out from the mouthpiece of the extruding press by means of a tangential fan, the shape of the piece of tube being kept even independent of the alteration of the free volume by the raising and lowering of the mandrel in order to prevent too strong an inflation of the piece of tube while resting against the mandrel. In such a case the supporting air supplied by the tangential fan will be sterilized by means of a cartridge heater having slight resistance to flow through. A filter cannot be used due to its high resistance to flow through as the pressure for the inflation of the tube must be about one and one hundredth times atmospheric pressure. In order to maintain the slight excess pressure in the hose extruded from the extruder, there is a tangential aerator which conveys a large quantity of air under approximately the same pressure and which is in a position, as a result thereof to varying empty volumes during the operation. Such a measure has proven itself to be favorable, particularly whenever the filling device has been disposed coaxially in relation to the extruder.

What I claim is:

1. Apparatus for the sterilization of a machine serving for the production, filling and closing of containers consisting of thermoplastic plastic comprising a dosing device having a dosing chamber limited by a shifting piston and controlled by a feed and outlet valve, a filling device connected to said outlet valve and having a gas feed line to be connected at least from time to time with the container that is to be produced, said gas feed line having a bacteriological filter therein, said filling device cooperating from time to time at least with a molding arrangement serving for the production of the container, a source for sterilization agent, two connections from said source to said dosing device, one said connection being to one side of the shifting piston and the other said connection being to the other side of the shifting piston, said one of said connections being made through said feed valve to said dosing chamber, and a third connection from said source to said gas feed line upstream of said bacteriological filter, whereby sterilizing agent from said source is passed to said dosing device on each side of said shifting piston, then from said dosing chamber to and through said filling device and further sterilizing agent is passed from said source to said gas feed line through said bacteriological filter and through said filling device, the sterilizing agent thereby being passed through said filling device in two paths.

2. Apparatus according to claim 1, in which during the operation of the apparatus the dosing device on said other side of said piston is open to the outside air through a valve.

3. Apparatus according to claim 1, in which the mouth of the filling device is surrounded by a means for passing sterile gas during the operation so that the sterile gas will flow around the mouth of the filling device.

4. Apparatus according to claim 1, in which the filling device is disposed separately from an extruder through the head of which a second gas feed line feeds, said second gas feed line having a second bacteriological filter therein and being connected to said third connection from said source upstream of said second bacteriological filter.

5. Apparatus according to claim 4 in which in the case of use of steam as a sterilizing agent, a condensate remover is removably connected in series at least with the filling device.

6. Apparatus according to claim 4 in which the valves are in the form of tube valves, whose resilient hose is to be clamped by a cam, and in which the connection between the two valves leads through the dosing chamber of the dosing device.

7. Apparatus according to claim 4 in which the valves are in the form of tube valves, whose resilient hose is to be clamped by a cam, and in which the connection between the two valves leads through the dosing chamber of the dosing device, the hose for the two valves being guided in parallel to one another on a front wall of the dosing device and the cams of the two valves being disposed on one common shaft, whereby passage through the two hoses is free in the case of a middle position lying between their border position for the closing each time of one valve.

* * * * *